US012675992B2

(12) United States Patent　　　(10) Patent No.:　US 12,675,992 B2
Shao et al.　　　　　　　　　　　　(45) Date of Patent:　　　Jul. 7, 2026

(54) ACCURATE INVERSION METHOD AND SYSTEM FOR ABOVEGROUND BIOMASS OF URBAN VEGETATIONS CONSIDERING VEGETATION TYPE

(71) Applicant: WUHAN UNIVERSITY, Hubei (CN)

(72) Inventors: Zhenfeng Shao, Hubei (CN); Xiaodi Xu, Hubei (CN); Ya Zhang, Hubei (CN); Zhenyu Zhang, Hubei (CN)

(73) Assignee: WUHAN UNIVERSITY, Hubei (CN)

( * ) Notice: Subject to any disclaimer, the term of this patent is extended or adjusted under 35 U.S.C. 154(b) by 310 days.

(21) Appl. No.: 18/527,352

(22) Filed: Dec. 3, 2023

(65) Prior Publication Data

US 2024/0312206 A1　　Sep. 19, 2024

(30) Foreign Application Priority Data

Mar. 17, 2023　(CN) .......................... 202310262518.1

(51) Int. Cl.
　*G06V 20/10*　　　(2022.01)
　*G06V 20/13*　　　(2022.01)
(52) U.S. Cl.
　CPC ............ *G06V 20/188* (2022.01); *G06V 20/13* (2022.01); *G06V 20/194* (2022.01)
(58) Field of Classification Search
　CPC ..... G06V 20/188; G06V 20/194; G06V 20/13
　See application file for complete search history.

(56) References Cited

U.S. PATENT DOCUMENTS

| | | | |
|---|---|---|---|
| 11,481,904 B1* | 10/2022 | Holkesvik | ............. G06T 7/0002 |
| 2010/0225531 A1* | 9/2010 | Johnson | ................. G01S 17/89 |
| | | | 342/25 A |
| 2018/0373932 A1* | 12/2018 | Albrecht | .............. G06V 20/188 |
| 2019/0339242 A1* | 11/2019 | Wang | .................... G01N 21/31 |
| 2020/0334458 A1* | 10/2020 | Glenn | ................. G06V 20/188 |
| 2022/0225075 A1* | 7/2022 | Shao | .................... H04W 12/069 |
| 2022/0415022 A1* | 12/2022 | Brumby | .............. G06V 10/774 |
| 2023/0316555 A1* | 10/2023 | Spangenberg | ......... G06V 10/82 |
| | | | 345/419 |

* cited by examiner

*Primary Examiner* — Syed Haider
(74) *Attorney, Agent, or Firm* — JCIP GLOBAL INC.

(57)　　　　　ABSTRACT

The present disclosure provides an accurate inversion method and system for aboveground biomass of urban vegetations considering vegetation types. The method includes: based on different research regions, performing corresponding biomass calculation after plot sampling; pre-processing high-resolution optical data and space-borne photon counting LiDAR data, performing fine extraction on urban vegetation information, extracting spectral features of high-resolution remote-sensing image data and constructing an optical-biomass inversion sub-model, extracting vegetation height data of the space-borne photon counting LiDAR data and constructing a space-borne LiDAR-biomass inversion sub-model; with the support of the information on fine classification on the urban vegetation types, performing integration on the biomass inversion sub-models; based on the sample plot biomass data of the urban vegetations, obtaining an integrated inversion model fusing the horizontal information and the three-dimensional structure information of the urban land surface vegetations by training to perform accurate mapping of the aboveground biomass of the urban vegetations.

17 Claims, 1 Drawing Sheet

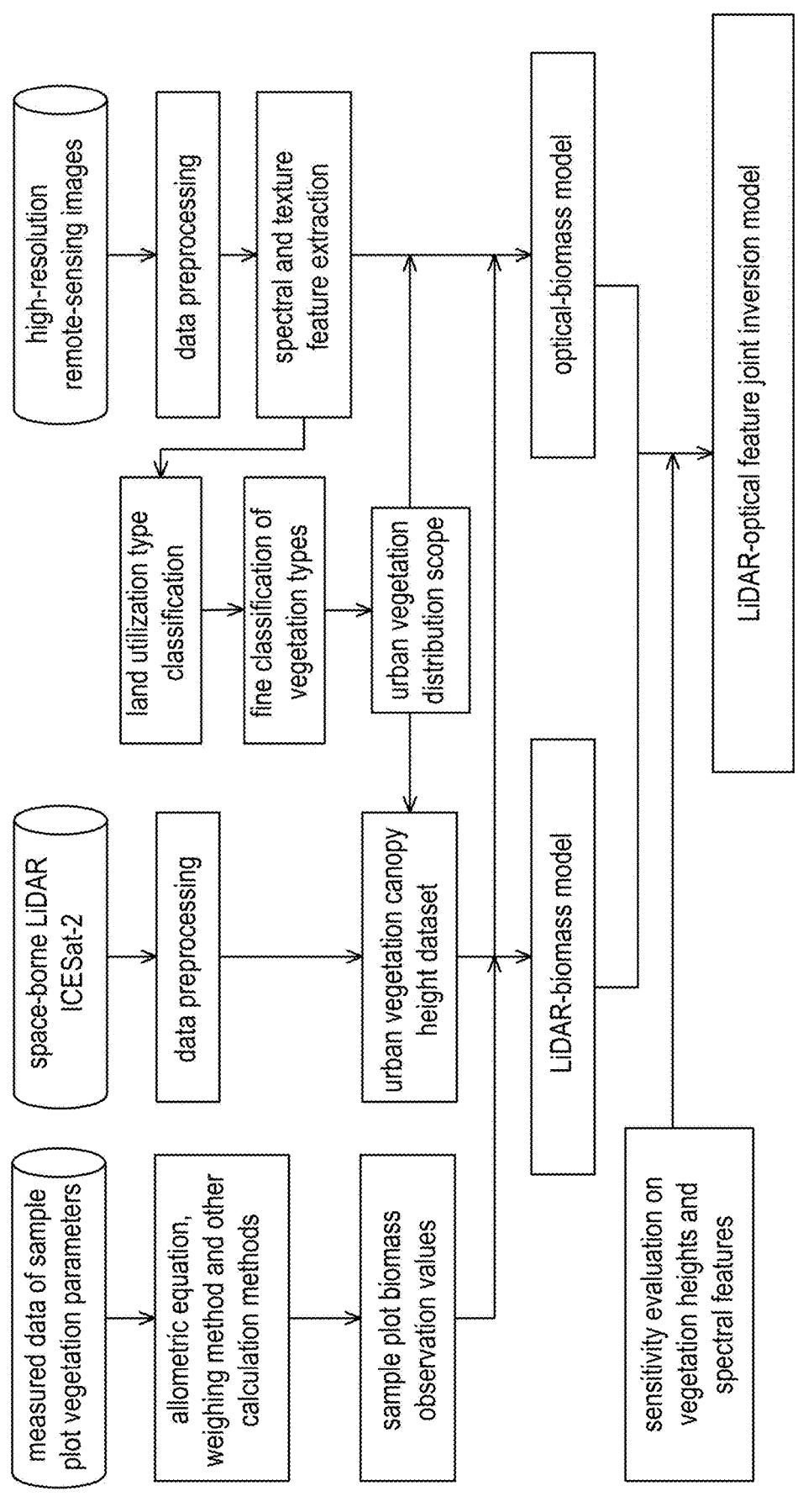

ACCURATE INVERSION METHOD AND SYSTEM FOR ABOVEGROUND BIOMASS OF URBAN VEGETATIONS CONSIDERING VEGETATION TYPE

CROSS-REFERENCE TO RELATED APPLICATION

This application claims the priority benefit of China application serial no. 202310262518.1, filed on Mar. 17, 2023. The entirety of the above-mentioned patent application is hereby incorporated by reference herein and made a part of this specification.

TECHNICAL FIELD

The present disclosure relates to the field of aboveground biomass inversion of urban vegetation and in particular to an accurate inversion solution of aboveground biomass of urban large-scope vegetations considering vegetation type.

BACKGROUND

Global climate changes bring significant impacts to the productions and lives of human, and the problems such as climate warming, urban flooding and air pollution and the like always restrict the development of human. The United Nations Framework Convention for Climate Change states that each party to the convention should take a road to green low-carbon development on fairness basis to achieve harmony between nature and human. China undertakes from its own basic national conditions that efforts will be made to realize "carbon to peak" by 2030 and "carbon neutrality" will be achieved by 2060. In this way, the decreased carbon emissions and increased carbon sequestration can be achieved to improved energy efficiency and advance the green energy development. Vegetation, as an important green infrastructure in natural resources, has a carbon storage capability which is an important approach to "collect" carbon from atmosphere by natural resource carbon pools. In recent years, with deepening understanding for the ecological systems of the major vegetations such as forests, grasslands and wetlands, people have preliminarily mastered a method of measuring vegetation carbon storage capabilities distributed by large-scope homogeneous vegetations by using biomass. As the concepts such as "green city" and "low carbon city" and the like emerge, the carbon storage capabilities of those scattered vegetations in the cities have drawn more and more attention. The understanding for their distribution and biomass calculation, and the states and trends of the ecological processes relating to them in multiple spatiotemporal dimensions is an important support for constructing a low-carbon green city as well as a key step for reducing the global carbon sink estimation error.

The vegetation composition of the forests and grasslands is simple and their biomass is usually estimated in the following manner: planning a large-scale sample, performing sampling investigation to estimate vegetation parameters, and then calculating a sample biomass based on vegetation growth equation so as to obtain a biomass of the whole forest land or grassland. This method is applicable to land surfaces with single uniformly-distributed vegetation, for example, forests and grasslands, where good results are achieved. Due to human planning and growth environment, the distribution of the urban vegetations is usually not in compliance with the first law of geography, and fragmentation may often occur in the cities (with the forestland region as main, enriched by shrubs and grasslands while landscape visualization is considered). Thus the vegetations have complex and dynamic features. Meanwhile, the ecological system services provided by them are dependent on vegetation types, composition structures and local environmental conditions. Due to a variety of vegetation compositions and scattered distributions, it is impossible to simply rely on prior knowledge to determine the vegetation types in the cities and further perform simple calculations during an inversion process of the urban biomass. The aboveground biomass inversion method of the scenes such as forests and grasslands is not applicable to the aboveground biomass estimation inside cities. Further, it is difficult for the size and distribution of the vegetation patches to satisfy the sampling requirements of the ecological systems of the large-scale vegetations such as forests and grasslands. As a result, it is urgent to need a method of extracting distribution information of different types of vegetations in the cities so as to obtain support data for biomass calculation.

The biomass inversion is usually performed by remote sensing estimation. After performing destructive sampling within a given scope, an allometric equation is obtained by summary of experiences to calculate its biomass, and a correlation relationship between sample data and remote sensing feature variables is established. Optical remote sensing data can provide unique canopy spectral information of the land surface vegetation to analyze growth states of different vegetations and perform biomass inversion. LiDAR data can provide three-dimensional structure information of the vegetations such as vegetation heights for remote sensing biomass estimation. The optical data can provide continuous land surface information, but the LiDAR data is usually limited by data collection manner and measurement costs and thus can only perform small-scope measurement. During the biomass inversion in cities or in the whole country or even across the world, the regional restriction of the LiDAR data is problematic. The space-borne LiDAR data can achieve acquisition of large-scope vegetation three-dimensional information and perform the biomass inversion and carbon sink estimation of the urban vegetations.

Furthermore, by measurement of sample data, the biomass inversion can be performed with the optical data or the space-borne LiDAR data. The two types of data provide the horizontal information and the three-dimensional structure information of the vegetations. How to fuse the information expressed by both of them into the urban application scenes to improve the biomass inversion accuracy is also a problem to be solved in the urban biomass estimation. By now, there are no reports about performing aboveground biomass inversion of large-scope urban vegetations with integration of the information of both of them.

SUMMARY

For the above problems, the present disclosure provides a new aboveground biomass inversion method of urban vegetations to realize an accurate inversion method of aboveground biomass of large-scope urban vegetations, which fuses space-borne photon counting LiDAR data and high-resolution optical data. In the technology of the present disclosure, by high-resolution optical data, accurate extraction for urban vegetation type information is achieved, and by the space-borne photon counting LiDAR data, large-scope urban vegetation heights are obtained, and by integrating the space-borne LiDAR data and the optical data, accurate inversion of the urban vegetation biomass can be achieved, filling the blank of the aboveground biomass inversion of the urban vegetations.

The present disclosure provides an accurate inversion method of aboveground biomass of urban vegetations considering vegetation types, which includes the following steps:

at step a, calculating a sample plot biomass within a research region, comprising achieving corresponding biomass calculation after plot sampling based on major urban vegetation types within the research region;

at step b, preprocessing high-resolution optical data and space-borne photon counting LiDAR data, comprising performing geometric and radiometric correction for the high-resolution optical data and performing data cleaning and data extraction on the space-borne photon counting LiDAR data;

at step c, performing fine extraction on urban vegetation information, comprising obtaining dominant vegetations growing within cities and traits thereof based on field sampling and various statistic data, defining urban surface land utilization types respectively, extracting features of different urban vegetation types, and performing fine classification on the urban vegetation types to provide basic data for the accurate estimation of the aboveground biomass of the urban vegetations;

at step d, extracting spectral features of high-resolution remote-sensing image data and constructing an optical-biomass inversion sub-model, comprising with the spectral features as independent variable and with biomass as dependent variable, by using sampling points, constructing a feature-biomass relationship; by using the plot biomass data obtained in the step a and the information on fine classification on the urban vegetation types obtained in the step c, based on the obtained spectral features, selecting a regression model with good estimation effect to construct the optical-biomass sub-model so as to provide a sub-model for integrated inversion;

at step e, extracting vegetation height data of the space-borne photon counting LiDAR data and constructing a space-borne LiDAR-biomass inversion sub-model, comprising after performing filtering and denoising on urban adaptive photon point cloud data, based on a resolution of the high-resolution optical data, determining a size of a window of the vegetation height data and performing extraction on vegetation height features; by using the sample plot biomass obtained in the step a and the information on fine classification on the urban vegetation types obtained in the step c, based on the obtained vegetation height features, selecting a regression model with good estimation effect to construct the space-borne LiDAR-biomass inversion sub-model for integrated inversion;

at step f, performing inversion on aboveground biomass of large-scope urban land surface vegetations, comprising, with the support of the information on fine classification on the urban vegetation types obtained in the step c, based on an integration model constructed by decision tree, performing integration on the biomass inversion sub-models obtained in the steps d and e; based on the sample plot biomass data of the urban vegetations obtained in the step a, obtaining an integrated inversion model fusing horizontal information and three-dimensional structure information of the urban land surface vegetations by training to perform accurate mapping of the aboveground biomass of the urban vegetations.

Furthermore, in the step c, classifying urban regional land surface to define the urban land surface types respectively as impervious surface $LU_i$, water body $LU_w$, bare land $LU_s$, and vegetation $LU_v$ . . . ; performing superpixel segmentation on high-resolution multispectral data of the research region obtained in the step b to extract spectral features, texture features and other features for the defined urban land surface type to enable an inter-class difference of different land utilization types to be maximal and an intra-class difference to be minimal; by combining different influential factors, determining the land utilization types, with the expression shown below:

$$LU = a \times f(\text{Feature}_S) + b \times f(\text{Feature}_T) + (1 - a - b) \times f(\text{Feature}_O)$$

wherein $f(\text{Feature}_S)$ is a discriminative model of the spectral features, $f(\text{Feature}_T)$ is a discriminative model of the texture features, $f(\text{Feature}_O)$ is a discriminative model of other features, and a, b and c are respective weights of the three discriminative models;

performing further division based on a scope of $LU_v$, and based on the dominant trees, performing fine extraction on the urban vegetation types within the research region to respectively extract spectra features, texture feature and other features of different typical vegetations, where the vegetation type expression during the fine extraction of the urban vegetation types is $$LU_v = a_v \times f(\text{Feature}_{S_v}) + b_v \times f(\text{Feature}_{T_v}) + (1 - a_v - b_v) \times f(\text{Feature}_{O_v}).$$

Furthermore, the implementation manner of constructing the optical-biomass inversion sub-model in the step d is that, with the spectral features $\text{Feature}_S$ as independent variable, biomass AGB as dependent variable, simulating a relationship between the spectral features and the biomass, and with the sample points as true values, solution is made with the spectral feature values and the biomass to obtain the optical-biomass sub-model $AGB_S=f$ ($\text{Feature}_S$); during a model selection process, different regression analysis methods are compared to select a good model.

Furthermore, the implementation manner of constructing the space-borne LiDAR-biomass inversion sub-model in the step e is that, with the space-borne LiDAR vegetation height features $\text{Feature}_L$ as independent variable, and with the biomass as dependent variable, a relationship between the space-borne LiDAR vegetation height features and the biomass is simulated, and with the biomass of the sample points as true values, solution is made with the space-borne LiDAR vegetation height features and the biomass to obtain the space-borne LiDAR-biomass inversion sub-model $AGB_L=f$ ($\text{Feature}_L$); during a model selection process, different regression analysis methods are compared to select a good model.

Furthermore, the implementation manner of constructing the space-borne LiDAR-optical integrated model in the step f is that, with the well-performing models obtained in the steps d and e as independent variable, and with the biomass as dependent variable, by using the urban vegetation types obtained in the step c as constraint conditions, several relations between models and biomass are simulated by decision tree; with the sample points as true values, solution is made with the simulation biomass of several models and the true biomass to obtain a space-borne LiDAR-optical integrated model.

On the other hand, there is provided an accurate inversion system for aboveground biomass of urban vegetations considering vegetation types, applied to perform the accurate inversion method of the aboveground biomass of the urban vegetations considering vegetation types.

Furthermore, the system includes the following modules:

a first module, configured to calculate the sample plot biomass within the research region, comprising achieving corresponding biomass calculation after plot sampling based on the major urban vegetation types within the research region;

a second module, configured to preprocess the high-resolution optical data and the space-borne photon counting LiDAR data, comprising performing geometric and radiometric correction for the high-resolution optical data and performing data cleaning and data extraction on the space-borne photon counting LiDAR data;

a third module, configured to perform fine extraction on the urban vegetation information within the research region, comprising performing feature extraction on different urban vegetation types, and performing fine classification on the urban vegetation types and the like to provide basic data for the accurate estimation of the aboveground biomass of the urban vegetations;

a fourth module, configured to extract the spectral features of the high-resolution remote-sensing image data and construct the optical-biomass inversion sub-model, comprising by using the sample plot biomass data obtained by the first module and the information on fine classification on the urban vegetation types obtained by the third module, based on the obtained spectral features, selecting a regression model with good estimation effect to construct the optical-biomass sub-model so as to provide a sub-model for integrated inversion;

a fifth module, configured to extract the vegetation height data of the space-borne photon counting LiDAR data and construct the space-borne LiDAR-biomass inversion sub-model, comprising after performing filtering and denoising on the urban adaptive photon point cloud data, based on the resolution of the high-resolution optical data, determining the size of the window for statistics of the vegetation height data and performing extraction on the vegetation height features; by using the sample plot biomass data obtained in the first module and the information on fine classification on the urban vegetation types obtained by the third module, based on the obtained vegetation height features, selecting a regression model with good estimation effect to construct the space-borne LiDAR-biomass inversion sub-model so as to provide a sub-model for integrated inversion;

a sixth module, configured to perform inversion on aboveground biomass of large-scope urban land surface vegetations, comprising, with the support of the information on fine classification on the urban vegetation types obtained by the third module, based on the integration model constructed by the decision tree, performing integration on the biomass inversion sub-models obtained by the fourth and fifth modules; based on the sample plot biomass data of the urban vegetations obtained by the first module, obtaining an integrated inversion model fusing the horizontal information and the three-dimensional structure information of the urban land surface vegetations by training to perform accurate mapping of the aboveground biomass of the urban vegetations.

Or, comprising a processor and a memory, wherein the memory is configured to store program instructions and the processor is configured to invoke the program instructions in the memory to perform the accurate inversion method of the aboveground biomass of the urban vegetations considering vegetation types.

Or, comprising a readable storage medium storing computer programs, wherein the computer programs are executed to perform the accurate inversion method of the aboveground biomass of the urban vegetations considering vegetation types.

In the present disclosure, when a joint inversion biomass model of the space-borne photon counting LiDAR data and the optical data is constructed, after vertical structure parameter-biomass inversion and planar optical parameter-biomass inversion of the vegetations are performed respectively, a biomass inversion method combining three-dimensional structure information and horizontal optical features of the vegetations is proposed. A sub-module is constructed by using the influence of three-dimensional structure parameters and the horizontal optical features of the vegetations obtained by the space-borne photon counting LiDAR on the biomass, and then by using a decision-tree-based stacking integration model, decision tree fusion is performed on a space-borne LiDAR-biomass inversion result and an optical-biomass inversion result to determine its influence on the biomass and the joint mechanism. In the present disclosure, by combining the three-dimensional structure information of the vegetations obtained by the space-borne LiDAR with the optical features of the high-resolution remote sensing images, a biomass remote sensing inversion model combining the three-dimensional structure parameters of the vegetations such as vegetation heights with the optical features so as to provide a new addition to the data sources of the urban biomass inversion. With advantages of combination of the space-borne LiDAR data and the optical data in the biomass inversion of the urban vegetations, the biomass inversion of the urban regions can be achieved.

BRIEF DESCRIPTIONS OF THE DRAWINGS

The FIGURE is a flowchart of an embodiment of the present disclosure.

DETAILED DESCRIPTIONS OF EMBODIMENTS

The present disclosure will be further described below in combination with drawings and specific embodiments.

Different from the previous inversion methods, the present disclosure introduces vegetation height data and high-resolution optical data obtained ICESat-2 to perform regression model construction together with urban biomass. Within the region of the urban vegetations extracted, proper vegetation factors and optical features are selected to construct a space-borne LiDAR-biomass inversion sub-model and an optical-biomass inversion sub-model; by performing sensitivity analysis on the two models, their weights for biomass inversion are determined and an urban aboveground biomass inversion model fusing the space-borne LiDAR and optical features is constructed.

The FIGURE illustrates an accurate inversion method of aboveground biomass of large-scope urban vegetations considering vegetation types according to an embodiment of the present disclosure, which is an urban aboveground biomass inversion method fusing space-borne LiDAR and optical features. The method specifically includes the following steps.

At step a, aboveground biomass calculation of sample points and sample plots within a research region is performed, comprising achieving corresponding biomass calculation after plot sampling by a sample plot biomass calculation method (for example, different allometric models and weighing methods and the like) based on major urban vegetation types within different research regions.

Taking trees as an example, within the research region, a data set is constructed by collecting vegetation parameters such as vegetation height, diameter at breast height, tree varieties and number and the like based on sampling and data planning. The aboveground biomass of a single-plant vegetation is calculated based on the formula (1), and then, based on a recorded ratio of the vegetation biomass within the sample plot to a sample plot area, a sample plot biomass is obtained.

$$W_S = a_1(D^2H)^{b_1}; W_B = a_2(D^2H)^{b_2}; \qquad \text{(Formula 1)}$$
$$W_L = a_3(D^2H)^{b_3}; W = W_S + W_B + W_L$$

wherein D refers to a diameter at breast height (unit: cm), H refers to a tree height (unit: m), $W_S$ refers to a trunk biomass, $W_B$ refers to a branch biomass, $W_L$ refers to a leave biomass, $a_1$, $a_2$, $a_3$, $b_1$, $b_2$, $b_3$ are respective coefficients, and W refers to total aboveground biomass.

At step b, high-resolution optical data and space-borne photon counting LiDAR data are preprocessed, comprising performing geometric and radiometric correction for the high-resolution optical data and performing data cleaning and data extraction on the space-borne photon counting LiDAR data.

In an embodiment, the high-resolution optical data and the ICESat-2ATL03 data within the research region are preprocessed.

Furthermore, geometric correction, radiometric calibration and orthorectification are performed on multispectral data of the high-resolution remote-sensing images; atmospheric correction is performed on the multispectral images by FLAASH based on parameters such as the sensor types of the high-resolution optical data, the geographical locations of the imaging centers, imaging time and height information and the like so as to obtain land surface reflectance data. Furthermore, panchromatic data is preprocessed and fused with the multispectral data to generate multispectral data with high resolution, providing data support for the fine extraction of the urban vegetations in the step c.

Furthermore, for the space-borne photon counting LiDAR data (ICESat-2 ATL03 data used by the embodiments), photon point data of corresponding strip within the research region is obtained firstly; after null values and abnormal values are cleaned, photon point height and the geographical coordinate of each photon point within the research region are obtained. For the obtained ATL03 raw point cloud data, its maximum and minimum elevations are calculated as $E_{max}$ and $E_{min}$; by natural break method, a statistics interval is set to calculate a frequency number of the elevation photon points; a point cloud density is calculated as a threshold to perform coarse de-noising of point clouds.

Furthermore, fine denoising is performed based on a distance between photon points after coarse denoising of point clouds is performed. Firstly, the distance between photon points is calculated based on the latitude and longitude obtained by the space-borne data and the corresponding elevation data. The case that the spacing distance is very small is present in the photon point data. In order to avoid a rounding error with the distance between two photon points close to each other, the latitude-longitude distance $d_L$ between two photon points is calculated based on the formula (2) in this embodiment:

$$d_L = R * \cos\{1/[\sin y_1 \sin y_2 + \cos y_1 \cos y_2 \cos(x_2 - x_1)]\} \qquad \text{(Formula 2)}$$

wherein, R refers to a radius of the earth, $y_1$ and $y_2$ refer to latitudes of two points, and $x_1$ and $x_2$ refer to longitudes of two points.

Afterwards, a Euclidean distance $D = \sqrt{d_L^2 + (\Delta h)^2}$ between any two photon points is calculated based on elevations ($\Delta h$ refers to a difference of elevations of two points), and further, a maximum distance $d_{max}$, a minimum distance $d_{min}$, and a difference $\Delta d$ therebetween are calculated. A segmentation interval is determined based on $\Delta d$, a frequency number of the distance D between photon points in each interval is calculated, and an interval with the largest distance frequency number is set to a neighboring EPS value. Afterwards, based on a minimum neighboring EPS obtained by calculation, photon point denoising test is performed on ICESAT-2 ATL03 data by using a denoising algorithm such as DBSCAN. Through multiple tests, the most appropriate MinPts are determined and the photon points gathered inside the point cloud cluster are stored, and the photon points determined as freed out of the point cloud cluster by the tests are considered as noise and removed and thus available height data is obtained.

At step c, fine extraction is performed on urban vegetation information within the research region, comprising obtaining dominant vegetations growing within cities and traits thereof based on field sampling and various statistic data, respectively performing definition on urban surface land utilization types, extracting the features of different urban vegetation types, and performing fine classification on the urban vegetation types to provide basic data for the accurate estimation of the aboveground biomass of the urban vegetations.

In an embodiment, the types of the dominant vegetations within the research region are obtained by performing investigation and consulting documents in advance; based on the field investigation data obtained by sampling in the step a, classification is firstly performed on the urban regional land surface types to define the urban land surface types respectively as impervious surface $LU_i$, water body $LU_w$ bare land $LU_s$, and vegetation $LU_v$ . . . . Superpixel segmentation is performed on the high-resolution multispectral data of the research region obtained in the step b to extract spectral features, texture features and other features for the defined urban land surface type objects to enable an inter-class difference of different land utilization types to be maximal and an intra-class difference to be minimal; by combining different influential factors, the land utilization types are determined, with the linear algorithm expression shown below:

$$LU = \quad \text{(Formula 3)}$$
$$a \times f(\text{Feature}_S) + b \times f(\text{Feature}_T) + (1 - a - b) \times f(\text{Feature}_O)$$

wherein $f(\text{Feature}_S)$ is a discriminative model of the spectral features, $f(\text{Feature}_T)$ is a discriminative model of the texture features, $f(\text{Feature}_O)$ is a discriminative model of other features, and a, b and c are respective weights of the three discriminative models.

Further division is performed based on the scope of $LU_v$, and based on the dominant trees, fine extraction is performed on the urban vegetation types within the research region to respectively extract spectral, texture information and other information of different typical vegetations, where the vegetation type expression during the fine extraction of the urban vegetation types is $LU_v = a_v \times f(\text{Feature}_{S_v}) + b_v \times f(\text{Feature}_{T_v}) + (1 - a_v - b_v) \times f(\text{Feature}_{O_v})$;

wherein $f(\text{Feature}_S)$ is a discriminative model of the spectral features, $f(\text{Feature}_T)$ is a discriminative model of the texture features, $f(\text{Feature}_O)$ is a discriminative model of other features, and a, b and c are respective weights of the three discriminative models.

Furthermore, during sample feature extraction, the spectral features selected in this embodiment include Normalized Difference Vegetation Index (NDVI), Difference Vegetation Index (DVI), Ratio Vegetation Index (RVI), green Chlorophyll Index (CIgreen), Modified Red Edge Normalized Difference Vegetation Index (MNDVI), Green Normalized Difference Vegetation Index (GNDVI), Enhanced Vegetation Index (EVI), Soil-Adjusted Vegetation Index (SAVI), and Modified Soil-Adjusted Vegetation Index (MSAVI), and their calculation formulas are formulas 4 to 12 below:

$$NDVI = \frac{NIR - R}{NIR + R} \quad \text{(Formula 4)}$$

$$DVI = NIR - R \quad \text{(Formula 5)}$$

$$RVI = \frac{NIR}{R} \quad \text{(Formula 6)}$$

$$CIgreen = \frac{NIR}{G} \quad \text{(Formula 7)}$$

$$MNDVI = \frac{(NIR - R) \times G}{(NIR + R) \times R} \quad \text{(Formula 8)}$$

$$GNDVI = \frac{NIR - G}{NIR + R} \quad \text{(Formula 9)}$$

$$EVI = \frac{2.5 \times (NIR - R)}{1 + NIR + 6 \times R - 7.5 \times B} \quad \text{(Formula 10)}$$

$$SAVI = \frac{(1 + L) \times (NIR - R)}{NIR + R + L} \quad \text{(Formula 11)}$$

$$MSAVI = NIR + 0.5 - \sqrt{(NIR + 0.5)^2 - 2 \times (NIR - R)} \quad \text{(Formula 12)}$$

wherein NIR, R, G and B are reflectances of near infrared band, red light band, green light band and blue light band respectively, and L is canopy background adjustment coefficient.

The texture features selected in this embodiment are band mean $\overline{C}_L$ of each object, brightness b, standard deviation $\sigma_L$, a length-to-width ratio $\gamma$ of image objects, shape index s, and density d, and their formulas are formulas 13 to 18 below:

$$\overline{C}_L = \frac{1}{n} \cdot \sum_{i=1}^{n} C_{L_i} \quad \text{(Formula 13)}$$

$$b = \frac{1}{n_L} \cdot \sum_{i=1}^{n_L} \overline{C}_i \quad \text{(Formula 14)}$$

$$\sigma_L = \sqrt{\frac{1}{n - 1} \cdot \sum_{i=1}^{n} \left(C_{L_i} - \overline{C}_L\right)^2} \quad \text{(Formula 15)}$$

$$\gamma = \frac{a^2 + ((1 - f) \cdot b)^2}{A}; f = \frac{A}{a \cdot b} \quad \text{(Formula 16)}$$

$$s = \frac{e}{4 \cdot \sqrt{A}} \quad \text{(Formula 17)}$$

$$d = \frac{\sqrt{n}}{1 + \sqrt{\text{Var}(X) + \text{Var}(Y)}} \quad \text{(Formula 18)}$$

wherein n refers to a number of pixels forming one image object, $C_{L_i}$ refers to a value of each pixel in this layer, $n_L$ refers to a number of layers containing spectral information, $\overline{C}_i$ refers to a mean value of the layers containing spectral information, a refers to a length of a bounding box of an object, b refers to a width of a bounding box, f refers to a padding degree of a bounding box, A refers to an area of an image object, e refers to a boundary length of an image, X refers to x coordinate of all pixels forming an image object, Y refers to y coordinates of all pixels forming an image object, and Var(X) and Var(Y) are variances.

At step d, spectral features of high-resolution remote-sensing image data are extracted and an optical-biomass inversion sub-model is constructed, comprising with the spectral features as independent variable and with biomass as dependent variable, by using sampling points, constructing a feature-biomass relationship; by using the plot biomass data obtain the step a and the information on fine classification on the urban vegetation types obtained in the step c, based on the obtained spectral features, selecting a regression model with good estimation effect to construct the optical-biomass sub-model so as to provide a sub-model for integrated inversion.

Furthermore, the implementation manner of constructing the optical-biomass inversion sub-model in the step d is that, with the spectral features $\text{Feature}_S$ as independent variable, biomass AGB as dependent variable, a relationship between the spectral features and the biomass is simulated, and with the sample points as true values, solution is made with the spectral feature values and the biomass to obtain the optical-biomass sub-model $\text{AGB}_S = f(\text{Feature}_S)$; during a model selection process, different regression analysis methods are compared to select good models defined as $\text{AGB}_{S1} = f \ \text{Feature}_S)$ and $\text{AGB}_{S2} = f(\text{Feature}_S) \ldots$.

At step e, vegetation height data of the space-borne photon counting LiDAR data is extracted and a space-borne LiDAR-biomass inversion sub-model is constructed, comprising after performing filtering and denoising on urban adaptive photon point cloud data, based on the resolution of the high-resolution optical data, determining a size of a window for statistics of the vegetation height data and performing extraction on the vegetation height features; by using the sample plot biomass data obtained in the step a and the information on fine classification on the urban vegetation types obtained in the step c, based on the obtained vegetation height features, selecting a regression model with good estimation effect to construct the space-borne LiDAR-biomass inversion sub-model so as to provide a sub-model for integrated inversion.

In an embodiment, the vegetation height data of ICESat-2 ATL03 data is extracted and the space-borne LiDAR-biomass inversion sub-model is constructed; filtering and denoising are performed on the urban adaptive ICESat-2 data; based on the resolution of the high-resolution optical data, the size of the window for statistics of the vegetation height data is determined, and extraction is performed on the vegetation height features; by using the sample plot biomass data obtained by the first module and the fine classification information of the urban land surface vegetation obtained by the third module, based on the obtained vegetation height features, a regression model with good estimation effect is selected to construct the space-borne LiDAR-biomass inversion sub-model, so as to provide a sub-model for integrated inversion.

Furthermore, based on the resolution of the optical images, a 4 m*4 m window is constructed in this embodiment to calculate the heights of the space-borne LiDAR data within the window; based on the obtained vegetation heights, in this embodiment, a 98th percentile height value h corresponding to each segment, a central canopy height h_centroid, a difference h_dif between the 98% canopy height value of each segment and a canopy height median, a mean canopy height h_mean, a canopy height median h_median and a minimum canopy height h_min are selected from the extracted data for calculation.

Furthermore, the implementation manner of constructing the space-borne LiDAR-biomass inversion sub-model in the step e is that, based on the vegetation distribution regions obtained in the step c, the data of photon points overlapping with the sample plot is obtained; with the vegetation height percent heights and statistics data $Feature_L$ obtained in the step d as independent variable, and with the biomass observation values obtained in the step a as dependent variable, models such as stepwise linear regression, Bayesian ridge regression, ordinary linear regression, elastic net regression, support vector machine regression, random forest regression, gradient boosting regression, and deep learning and the like are used to perform regression modeling so as to obtain a relationship between the space-borne LiDAR vegetation heights and the biomass; with the sample points as true values, regression analysis is performed based on the space-borne LiDAR vegetation height feature values and the biomass to obtain the space-borne LiDAR-biomass inversion sub-model $AGB_L$=f($Feature_L$); by using k-fold cross validation method, estimation is performed; based on a regression coefficient R, a coefficient of determination $R^2$ and a root mean square error RMSE of the model, the accuracy of the regression model is determined; appropriate inversion parameters and a model with a highest comprehensive accuracy are selected and models with high comprehensive accuracy are selected as to-be-selected items of the space-borne LiDAR-biomass inversion sub-model, which are respectively defined as $AGB_{L1}$=f($Feature_L$) and $AGB_{L2}$=f($Feature_L$) . . . , and further, vegetation biomass strip data corresponding to the vegetation height strip obtained in the step d is obtained.

At step f, inversion is performed on aboveground biomass of large-scope urban land surface vegetations, comprising, with the support of the information on fine classification on the urban vegetation types obtained in the step c, based on an integration model constructed by decision tree, performing integration on the biomass inversion sub-models obtained in the steps d and e; based on the sample plot biomass data of the urban vegetations obtained in the step a, obtaining an integrated inversion model fusing the horizontal information and the three-dimensional structure information of the urban land surface vegetations by training to perform accurate mapping of the aboveground biomass of the large-scope urban vegetations.

Furthermore, the integration model selected in the present disclosure is constructed based on a regression tree. The integration model selected in the present disclosure has two features which are a to-be-selected result of the space-borne LiDAR-biomass inversion sub-model and an optical-biomass inversion result. If the test set of the space-borne LiDAR-biomass inversion sub-model and the optical-biomass inversion sub-model has n samples with vegetation types being m, the feature spatial dimension of the integration model is n*m; with the biomass measured values as true values, four model-based inputs of the space-borne LiDAR-biomass inversion sub-model and the optical-biomass inversion sub-model are used as inputs of the decision tree to train the sub-model; finally, the outputs of the decision tree are used as true inversion results to train the integration model of the decision tree. By the Gaofen No. 2 data and ICESat-2 data of the research region, the aboveground biomass inversion of the urban vegetations can be achieved.

The implementation manner of constructing the space-borne LiDAR-biomass inversion sub-model is that, with the well-performing models such as $AGB_{S1}$, $AGB_{S2}$, $AGB_{L1}$=f ($Feature_L$) and $AGB_{L2}$=f($Feature_L$) obtained in the steps d and e as independent variable and with the biomass as dependent variable, by using the vegetation types obtained in the step c as constraint conditions, a relationship between several models and the biomass is simulated with the decision tree; with the biomass of the sample points as true values, solution is made with the simulation biomass of several models and the true biomass; based on a regression coefficient R, a coefficient of determination $R^2$ and a root mean square error RMSE of the model, the accuracy of the model is determined to obtain the space-borne LiDAR-optical integrated model.

$$AGB = \begin{cases} a_1 AGB_{Sn} + b_1 AGB_{Ln'}, & (LU_V = LU_1) \\ a_2 AGB_{Sn_2} + b_2 AGB_{Ln_2'}, & (LU_V = LU_2) \\ \quad \cdots\cdots \\ a_m AGB_{Sn_m} + b_m AGB_{Ln_m'}, & (LU_V = LU_m) \end{cases} \quad \text{(Formula 19)}$$

wherein AGB refers to a biomass result finally obtained by the integration model; $a_m$ and $b_m$ are weights of the parameters of the integration model determined by the vegetation type; $AGB_{Sn_m}$ and $AGB_{Ln_m}$ are the most accurate models for the specific vegetation type inversion in several candidate models, i.e., the integration model, the optical-biomass model, and space-borne LiDAR-biomass inversion sub-model determined by the vegetation types; and $LU_V$ refers to a vegetation type which is a restrictive condition of each formula.

Furthermore, during a training process of the integration model, it is required to normalize the inversion value of the space-borne LiDAR-biomass inversion sub-model and the inversion value of the optical-biomass model as shown in the formula (20):

$$y_i = \frac{x_i - x_{min}}{xmin_{max}} \quad \text{(Formula 20)}$$

wherein $x_i$ refers to the inversion value of the space-borne LiDAR-biomass inversion sub-model and the inversion value of the optical-biomass model in an i-th biomass scenario; $y_i$ refers to a corresponding normalization result; $x_{min}$ and $x_{max}$ respectively refer to a minimum value and a maximum value of the inversion result of the space-borne LiDAR-biomass inversion sub-model and the inversion result of the optical-biomass model in all scenarios, and they will be recorded for model prediction purpose.

In a specific implementation, the method proposed in the technical solutions of the present disclosure may be automatically run by those skilled in the arts adopting the computer software technology, and a system apparatus for performing the method, for example, a computer readable storage medium storing corresponding computer programs of the technical solutions of the present disclosure and a computer device containing the corresponding computer programs are all fall within the scope of protection of the present disclosure.

In some possible implementations, there is provided an accurate inversion system for aboveground biomass of urban vegetations considering vegetation types, which includes the following modules:

a first module, configured to calculate a sample plot biomass within a research region, comprising achieving corresponding biomass calculation after plot sampling based on major urban vegetation types within the research region;

a second module, configured to preprocess high-resolution optical data and space-borne photon counting LiDAR data, comprising performing geometric and radiometric correction for the high-resolution optical data and performing data cleaning and data extraction on the space-borne photon counting LiDAR data;

a third module, configured to perform fine extraction on the urban vegetation information within the research region, comprising performing feature extraction on different urban vegetation types, and performing fine classification on the urban vegetation types and the like to provide basic data for the accurate estimation of the aboveground biomass of the urban vegetations;

a fourth module, configured to extract spectral features of high-resolution remote-sensing image data and construct an optical-biomass inversion sub-model, comprising by using the sample plot biomass data obtained by the first module and the information on fine classification on the urban vegetation types obtained by the third module, based on the obtained spectral features, selecting a regression model with good estimation effect to construct the optical-biomass sub-model so as to provide a sub-model for integrated inversion;

a fifth module, configured to extract vegetation height data of the space-borne photon counting LiDAR data and construct a space-borne LiDAR-biomass inversion sub-model, comprising after performing filtering and denoising on urban adaptive photon point cloud data, based on the resolution of the high-resolution optical data, determining a size of a window for statistics of the vegetation height data and performing extraction on the vegetation height features; by using the sample plot biomass data obtained in the first module and the information on fine classification on the urban vegetation types obtained by the third module, based on the obtained vegetation height features, selecting a regression model with good estimation effect to construct the space-borne LiDAR-biomass inversion sub-model so as to provide a sub-model for integrated inversion;

a sixth module, configured to perform inversion on aboveground biomass of large-scope urban land surface vegetations, comprising, with the support of the information on fine classification on the urban vegetation types obtained by the third module, based on an integration model constructed by decision tree, performing integration on the biomass inversion sub-models obtained by the fourth and fifth modules; based on the sample plot biomass data of the urban vegetations obtained by the first module, obtaining an integrated inversion model fusing the horizontal information and the three-dimensional structure information of the urban land surface vegetations by training to perform accurate mapping of the aboveground biomass of the large-scope urban vegetations.

In some possible embodiments, there is provided an accurate inversion system for aboveground biomass of urban vegetations considering vegetation types, which includes a processor and a memory, where the memory is configured to store program instructions and the processor is configured to invoke the program instructions in the memory to perform the accurate inversion method of the aboveground biomass of the urban vegetations considering vegetation types.

In some possible embodiments, there is provided an accurate inversion system for aboveground biomass of urban vegetations considering vegetation types, which includes a readable storage medium, storing computer programs, where the computer programs are executed to perform the accurate inversion method of the aboveground biomass of the urban vegetations considering vegetation types.

In conclusion, the present disclosure has the following characteristics.

Compared with the existing methods, during estimation of the aboveground biomass of the urban vegetations, association application can be performed based on the first law of geography, which is different from the environments such as forests and grasslands. Due to planning requirements, the urban vegetation distributions are usually limited. In the present disclosure, the distributions of different types of vegetations of the cities are obtained firstly based on vegetation classification-fine vegetation type classification, and then ICESat-2 data is introduced to provide the three-dimensional structure parameters of the large-scope vegetations. In combination with the spectral parameters provided by the high-resolution optical data, the vertical and horizontal structures of the urban vegetations can be better described. Joint inversion can be performed on both of them based on the integration model in combination with the vegetation type conditions such that the model has mathematical and physical significances. Furthermore, the fusion of the optical and space-borne LiDAR photon point information can provide more rich information for the biomass calculation, improving the biomass inversion accuracy of the urban vegetations under the complex underlying surface conditions. After inversion is performed respectively with the space-borne LiDAR and optical features to obtain a biomass result, in the present disclosure, the biomasses obtained by performing inversion with the two models are output by the decision-tree-based Stacking integration model and then dynamic fusion is performed based on the vegetation types of the research sample points to obtain a final inversion result. In the present disclosure, the advantages of the space-borne LiDAR data and the high-resolution optical data in obtaining the large-scope vegetation heights and full-coverage land surface optical parameters can be fully exerted. The combination of the vegetation height information and the spectral features can effectively exert the advantages of both of them, filling the blank of the estimation method of the aboveground biomass of the urban vegetations, and improving the model inversion accuracy of the aboveground biomass of the urban vegetations.

The specific embodiments of the present disclosure are illustrated only for the spirit of the present disclosure. Those skilled in the arts can make various changes or additions or replacements to the specific embodiments of the present disclosure without departing from the spirit of the present disclosure or exceeding the scope defined by the appended claims.

What is claimed is:

1. An inversion method of aboveground biomass of urban vegetations considering vegetation types, the method comprising the following steps:

at step a, calculating sample plot biomass data within a research region, comprising achieving corresponding biomass calculation after plot sampling based on major urban vegetation types within the research region;

at step b, preprocessing high-resolution optical data and space-borne photon counting Light Detection and Ranging (LiDAR) data, comprising performing geometric and radiometric correction for the high-resolution optical data and performing data cleaning and data extraction on the space-borne photon counting LiDAR data;

at step c, performing fine extraction on urban vegetation information, comprising obtaining dominant vegetations growing within cities and traits thereof based on field sampling and various statistic data, defining urban surface land utilization types respectively, extracting features of different urban vegetation types, and performing fine classification on the urban vegetation types to provide basic data for an estimation of the aboveground biomass of the urban vegetations;

at step d, extracting spectral features of high-resolution remote-sensing image data and constructing an optical-biomass inversion sub-model, comprising with the spectral features as independent variable and with biomass AGB as dependent variable, by using sampling points, constructing a feature-biomass relationship; by using the sample plot biomass data obtain in the step a and information on fine classification on the urban vegetation types obtained in the step c, based on the obtained spectral features, selecting a first regression model based on an estimation effect to construct the optical-biomass sub-model to provide a sub-model for integrated inversion;

at step e, extracting vegetation height data of the space-borne photon counting LiDAR data and constructing a space-borne LiDAR-biomass inversion sub-model, comprising after performing filtering and denoising on urban adaptive photon point cloud data, based on a resolution of the high-resolution optical data, determining a size of a window of the vegetation height data and performing extraction on vegetation height features; by using the sample plot biomass data obtained in the step a and the information on fine classification on the urban vegetation types obtained in the step c, based on the obtained vegetation height features, selecting a second regression model with good based on the estimation effect to construct the space-borne LiDAR-biomass inversion sub-model for integrated inversion;

at step f, performing inversion on aboveground biomass of large-scope urban land surface vegetations, comprising, with the support of the information on the fine classification on the urban vegetation types obtained in the step c, based on an integration model constructed by decision tree, performing integration on the optical-biomass inversion sub-model obtained in step d and the space-borne LiDAR-biomass inversion sub-model obtained in step e; based on the sample plot biomass data of the urban vegetations obtained in the step a, obtaining an integrated inversion model fusing horizontal information and three-dimensional structure information of the urban land surface vegetations by training to perform a mapping of the aboveground biomass of the urban vegetations.

2. The inversion method of claim 1, wherein in the step c, classifying urban regional land surface to define the urban land surface types respectively as impervious surface $LU_i$, water body $LU_w$, bare land $LU_s$, and vegetation $LU_v$; performing superpixel segmentation on high-resolution multispectral data of the research region obtained in the step b to extract spectral features, texture features and other features for the defined urban surface land utilization type to enable an inter-class difference of different land utilization types to be maximal and an intra-class difference to be minimal; by combining different influential factors, determining the land utilization types, with the expression shown below:

$$LU = a \times f(\text{Feature}_S) + b \times + (1 - a - b) \times f(\text{Feature}_O)$$

wherein f(Feature$_S$) is a discriminative model of the spectral features, f(Feature$_T$) is a discriminative model of the texture features, f(Feature$_O$) is a discriminative model of other features, and a, b and c are respective weights of the discriminative models of the spectral features, the texture features, and other features;

performing further division based on a scope of $LU_v$, and based on dominant trees, performing fine extraction on the urban vegetation types within the research region to respectively extract spectra features, texture feature and other features of different typical vegetations, where the vegetation type expression during the fine extraction of the urban vegetation types is $$LU_v = a_v \times f\left(\text{Feature}_{S_v}\right) + b_v \times f\left(\text{Feature}_{T_v}\right) + (1 - a_v - b_v) \times f\left(\text{Feature}_{O_v}\right).$$

3. The inversion method of claim 1, wherein the implementation manner of constructing the optical-biomass inversion sub-model in the step d is that, with spectral features Feature$_S$ as independent variable, the biomass AGB as dependent variable, simulating a relationship between the spectral features Feature$_S$ and the biomass AGB, and with the sample points as true values, solution is made with the spectral feature Feature$_S$ and the biomass AGB to obtain the optical-biomass sub-model AGB$_S$=f(Feature$_S$); during a model selection process, different regression analysis methods are compared to select a good model.

4. The inversion method of claim 3, wherein the implementation manner of constructing the space-borne LiDAR-biomass inversion sub-model in the step e is that, with space-borne LiDAR vegetation height features Feature as independent variable, and with the biomass AGB as dependent variable, a relationship between the space-borne LiDAR vegetation height features Feature$_L$ and the biomass AGB is simulated, and with the biomass AGB of the sample points as true values, solution is made with the space-borne LiDAR vegetation height features Feature$_L$ and the biomass AGB to obtain the space-borne LiDAR-biomass inversion sub-model $AGB_L=f(Feature_L)$; during a model selection process, different regression analysis methods are compared to select a good model.

5. The inversion method of claim 4, wherein the implementation manner of constructing a space-borne LiDAR-optical integrated model in the step f is that, with well-performing models obtained in the steps d and e as independent variable, and with the biomass AGB as dependent variable, by using the urban vegetation types obtained in the step c as constraint conditions, several relations between models and biomass are simulated by decision tree; with the sample points as true values, solution is made with the simulation biomass of several models and true biomass to obtain the space-borne LiDAR-optical integrated model.

6. An inversion system for aboveground biomass of urban vegetations considering vegetation types, applied to perform the inversion method of the aboveground biomass of the urban vegetations considering vegetation types according to claim 1;

wherein the inversion system comprises a processor and a memory, wherein the memory is configured to store program instructions and the processor is configured to invoke the program instructions in the memory to perform the inversion method of the aboveground biomass of the urban vegetations considering vegetation types.

7. The inversion system of claim 6, wherein the processor is further configured to:

calculate the sample plot biomass data within the research region, comprising achieving corresponding biomass calculation after plot sampling based on the major urban vegetation types within the research region;

preprocess the high-resolution optical data and the space-borne photon counting LiDAR data, comprising performing the geometric and radiometric correction for the high-resolution optical data and performing data cleaning and data extraction on the space-borne photon counting LiDAR data;

perform fine extraction on the urban vegetation information within the research region, comprising performing feature extraction on different urban vegetation types, and performing fine classification on the urban vegetation types to provide basic data for the estimation of the aboveground biomass of the urban vegetations;

extract the spectral features of the high-resolution remote-sensing image data and construct the optical-biomass inversion sub-model, comprising by using the calculated sample plot biomass data and the information on fine classification on the urban vegetation types, based on the obtained spectral features, selecting a first regression model based on the estimation effect to construct the optical-biomass sub-model to provide a sub-model for integrated inversion;

extract the vegetation height data of the space-borne photon counting LiDAR data and construct the space-borne LiDAR-biomass inversion sub-model, comprising after performing filtering and denoising on the urban adaptive photon point cloud data, based on the resolution of the high-resolution optical data, determining the size of the window for statistics of the vegetation height data and performing extraction on the vegetation height features; by using the calculated sample plot biomass data and the information on fine classification on the urban vegetation types, based on the obtained vegetation height features, selecting a second regression model based on the estimation effect to construct the space-borne LiDAR-biomass inversion sub-model to provide a sub-model for integrated inversion;

perform inversion on aboveground biomass of large-scope urban land surface vegetations, comprising, with the support of the information on fine classification on the urban vegetation types, based on the integration model constructed by the decision tree, performing integration on the optical-biomass inversion sub-model and the space-borne LiDAR-biomass inversion sub-model; based on the sample plot biomass data of the urban vegetations, obtaining an integrated inversion model fusing the horizontal information and the three-dimensional structure information of the urban land surface vegetations by training to perform the mapping of the aboveground biomass of the urban vegetations.

8. The inversion system of claim 6, comprising a readable storage medium storing computer programs, wherein the computer programs are executed to perform the inversion method of the aboveground biomass of the urban vegetations considering vegetation types.

9. The inversion method of claim 2, wherein the implementation manner of constructing the optical-biomass inversion sub-model in the step d is that, with spectral features $Feature_S$ as independent variable, biomass AGB as dependent variable, simulating a relationship between the spectral features $Feature_S$ and the biomass AGB, and with the sample points as true values, solution is made with the spectral feature $Feature_S$ and the biomass AGB to obtain the optical-biomass sub-model $AGB_S=f(Feature_S)$; during a model selection process, different regression analysis methods are compared to select a good model.

10. The inversion method of claim 9, wherein the implementation manner of constructing the space-borne LiDAR-biomass inversion sub-model in the step e is that, with space-borne LiDAR vegetation height features $Feature_L$ as independent variable, and with the biomass AGB as dependent variable, a relationship between the space-borne LiDAR vegetation height features $Feature_L$ and the biomass AGB is simulated, and with the biomass AGB of the sample points as true values, solution is made with the space-borne LiDAR vegetation height features $Feature_L$ and the biomass AGB to obtain the space-borne LiDAR-biomass inversion sub-model $AGB_L=f(Feature_L)$; during a model selection process, different regression analysis methods are compared to select a good model.

11. The inversion method of claim 10, wherein the implementation manner of constructing a space-borne LiDAR-optical integrated model in the step f is that, with well-performing models obtained in the steps d and e as independent variable, and with the biomass AGB as dependent variable, by using the urban vegetation types obtained in the step c as constraint conditions, several relations between models and biomass are simulated by decision tree; with the sample points as true values, solution is made with the simulation biomass of several models and true biomass to obtain the space-borne LiDAR-optical integrated model.

12. An inversion system for aboveground biomass of urban vegetations considering vegetation types, applied to perform the inversion method of the aboveground biomass of the urban vegetations considering vegetation types according to claim 2;

wherein the inversion system comprises a processor and a memory, wherein the memory is configured to store program instructions and the processor is configured to invoke the program instructions in the memory to perform the inversion method of the aboveground biomass of the urban vegetations considering vegetation types.

13. The accurate-inversion system of claim 12, wherein the processor is further configured to:

calculate the sample plot biomass data within the research region, comprising achieving corresponding biomass calculation after plot sampling based on the major urban vegetation types within the research region;

preprocess the high-resolution optical data and the space-borne photon counting LiDAR data, comprising performing the geometric and radiometric correction for the high-resolution optical data and performing data cleaning and data extraction on the space-borne photon counting LiDAR data;

perform fine extraction on the urban vegetation information within the research region, comprising performing feature extraction on different urban vegetation types, and performing fine classification on the urban vegetation types to provide basic data for the estimation of the aboveground biomass of the urban vegetations;

extract the spectral features of the high-resolution remote-sensing image data and construct the optical-biomass inversion sub-model, comprising by using the calculated sample plot biomass data and the information on fine classification on the urban vegetation types, based on the obtained spectral features, selecting a first regression model based on the estimation effect to construct the optical-biomass sub-model to provide a sub-model for integrated inversion;

extract the vegetation height data of the space-borne photon counting LiDAR data and construct the space-borne LiDAR-biomass inversion sub-model, comprising after performing filtering and denoising on the urban adaptive photon point cloud data, based on the resolution of the high-resolution optical data, determining the size of the window for statistics of the vegetation height data and performing extraction on the vegetation height features; by using the calculated sample plot biomass data and the information on fine classification on the urban vegetation types, based on the obtained vegetation height features, selecting a second regression model based on the estimation effect to construct the space-borne LiDAR-biomass inversion sub-model to provide a sub-model for integrated inversion;

perform inversion on aboveground biomass of large-scope urban land surface vegetations, comprising, with the support of the information on fine classification on the urban vegetation types, based on the integration model constructed by the decision tree, performing integration on the optical-biomass inversion sub-model and the space-borne LiDAR-biomass inversion sub-model; based on the sample plot biomass data of the urban vegetations obtained by the processor, obtaining an integrated inversion model fusing the horizontal information and the three-dimensional structure information of the urban land surface vegetations by training to perform the mapping of the aboveground biomass of the urban vegetations.

14. The accurate-inversion system of claim 12, comprising a readable storage medium storing computer programs, wherein the computer programs are executed to perform the inversion method of the aboveground biomass of the urban vegetations considering vegetation types.

15. An inversion system for aboveground biomass of urban vegetations considering vegetation types, applied to perform the inversion method of the aboveground biomass of the urban vegetations considering vegetation types according to claim 3;

wherein the inversion system comprises a processor and a memory, wherein the memory is configured to store program instructions and the processor is configured to invoke the program instructions in the memory to perform the inversion method of the aboveground biomass of the urban vegetations considering vegetation types.

16. The inversion system of claim 15, wherein the processor is further configured to:

calculate the sample plot biomass data within the research region, comprising achieving corresponding biomass calculation after plot sampling based on the major urban vegetation types within the research region;

preprocess the high-resolution optical data and the space-borne photon counting LiDAR data, comprising performing the geometric and radiometric correction for the high-resolution optical data and performing data cleaning and data extraction on the space-borne photon counting LiDAR data;

perform fine extraction on the urban vegetation information within the research region, comprising performing feature extraction on different urban vegetation types, and performing fine classification on the urban vegetation types to provide basic data for the estimation of the aboveground biomass of the urban vegetations;

extract the spectral features of the high-resolution remote-sensing image data and construct the optical-biomass inversion sub-model, comprising by using the calculated sample plot biomass data and the information on fine classification on the urban vegetation types, based on the obtained spectral features, selecting a first regression model based on the estimation effect to construct the optical-biomass sub-model to provide a sub-model for integrated inversion;

extract the vegetation height data of the space-borne photon counting LiDAR data and construct the space-borne LiDAR-biomass inversion sub-model, comprising after performing filtering and denoising on the urban adaptive photon point cloud data, based on the resolution of the high-resolution optical data, determining the size of the window for statistics of the vegetation height data and performing extraction on the vegetation height features; by using the calculated sample plot biomass data and the information on fine classification on the urban vegetation types, based on the obtained vegetation height features, selecting a second regression model based on the estimation effect to construct the space-borne LiDAR-biomass inversion sub-model to provide a sub-model for integrated inversion;

perform inversion on aboveground biomass of large-scope urban land surface vegetations, comprising, with the support of the information on fine classification on the urban vegetation types, based on the integration model constructed by the decision tree, performing integration on the optical-biomass inversion sub-model and the space-borne LiDAR-biomass inversion sub-model; based on the sample plot biomass data of the urban vegetations, obtaining an integrated inversion model fusing the horizontal information and the three-dimensional structure information of the urban land surface vegetations by training to perform the mapping of the aboveground biomass of the urban vegetations.

17. The inversion system of claim 15, comprising a readable storage medium storing computer programs, wherein the computer programs are executed to perform the inversion method of the aboveground biomass of the urban vegetations considering vegetation types.

\*   \*   \*   \*   \*